United States Patent [19]

Yukuta et al.

[11] 4,303,755
[45] Dec. 1, 1981

[54] SAFETY FUEL TANK CONTAINING RETICULATED POLYURETHANE FOAM MIXTURE OF POLY(OXYPROPYLENE-(OXYETHYLENE)-POLYETHERPOLYOLS

[75] Inventors: Toshio Yukuta; Kazuo Yagura; Nobuhisa Fuchigami, all of Yokohama, Japan

[73] Assignee: Bridgestone Tire Co., Ltd., Tokyo, Japan

[21] Appl. No.: 94,996

[22] Filed: Nov. 16, 1979

[30] Foreign Application Priority Data

Nov. 16, 1978 [JP] Japan ................................ 53-140415
May 4, 1979 [JP] Japan ................................ 54-54151

[51] Int. Cl.³ ............................................. C08G 18/14
[52] U.S. Cl. ..................................... 521/52; 280/5 A; 521/126; 521/127; 521/129; 521/130; 521/157; 521/174; 521/914
[58] Field of Search ................. 521/52, 126, 127, 129, 521/130, 157, 174, 914; 280/5 A

[56] References Cited

U.S. PATENT DOCUMENTS

| | | | |
|---|---|---|---|
| 3,793,241 | 2/1974 | Kyle et al. | 521/914 |
| 3,857,800 | 12/1974 | Fishbein et al. | 521/174 |
| 3,865,762 | 2/1975 | Repiquet et al. | 521/914 |
| 3,873,476 | 3/1975 | Jabs et al. | 521/914 |
| 3,890,254 | 6/1975 | Guthrie | 521/174 |

*Primary Examiner*—Maurice J. Welsh
*Attorney, Agent, or Firm*—Sughrue, Mion, Zinn, Macpeak and Seas

[57] ABSTRACT

A safety fuel tank for automobiles and the vehicles, wherein substantially skeletal reticulated flexible polyurethane foam is integrally foamed, is produced by reacting a mixture of (a) poly(oxypropylene-oxyethylene)polyetherpolyol having 51–98% by weight of ethylene oxide component and (b) poly(oxypropylene-oxyethylene)polyetherpolyol having not less than 51% by weight of propylene oxide component as the polyhydroxyl compound with an organic polyisocyanate in the presence of a catalyst, a foaming agent, a surfactant and an additive in a fuel tank.

10 Claims, 4 Drawing Figures

SAFETY FUEL TANK CONTAINING RETICULATED POLYURETHANE FOAM MIXTURE OF POLY(OXYPROPYLENE-(OXYETHYLENE)-POLYETHERPOLYOLS

The present invention relates to safety fuel tanks wherein substantially skeletal reticulated flexible polyurethane foam is integrally formed and a method for producing said tanks.

Heretofore, a dead block has been provided in a metal tank in general passanger cars in order to prevent a liquid fuel in a fuel tank from waving upon driving of vehicles, such as automobiles and to prevent occurrence of explosive fire owing to instantaneous scattering of a liquid fuel in the case of collision of car or breakage of tank. Furthermore, in a part of racing cars, a means wherein reticulated foam obtained by post-treating a flexible polyesterpolyurethane foam is inserted in the tank, has been adopted (Japanese Patent No. 497,085).

However, in the former means wherein a dead block is provided, a dead block must be welded to the tank and much labors are necessary for the working. In the latter means, very much manual labors are necessary for post-treatment of the flexible polyesterpolyurethane foam, cutting of this foam and working of the tank. Furthermore, in the fuel tank of automobiles, water stays in the tank due to various reasons and when the above described flexible polyesterpolyurethane foam is used, said foam is very low in the resistance against hydrolysis, so that the durability of the foam is short.

The inventors have made earnest study for overcoming the above described various drawbacks of the prior arts and as the result it has been found that a fuel tank integrated with substantially skeletal reticulated flexible polyurethane foam is obtained by feeding and foaming a given amount of flexible polyurethane foam compounding liquid consisting mainly of a mixture of the particularly defined poly(oxypropylene-oxyethylene) polyetherpolyols described in U.S. Patent Application No. 39,414 (filed on May 15, 1979), now U.S. Pat. No. 4,259,452, issued Mar. 31, 1981 and Japanese Patent Application No. 54,151/79 in a fuel tank, and the present invention has been accomplished.

Namely, a first aspect of the present invention consists in a safety fuel tank obtained by reacting a mixture of (a) poly(oxypropylene-oxyethylene)polyetherpolyol having 51–98% by weight of ethylene oxide component and (b) poly(oxypropylene-oxyethylene)polyetherpolyol having not less than 51% by weight of propylene oxide component as the polyhydroxyl compound with an organic polyisocyanate in the presence of a catalyst, a foaming agent, a surfactant and an additive to integrally foam substantially skeletal reticulated flexible polyurethane foam in a fuel tank.

A second aspect of the present invention consists in a method for producing the above described safety fuel tank in which a given amount of a compounding liquid for a flexible polyurethane foam consisting of polyhydroxyl compounds consisting of a mixture of (a) poly(oxypropyleneoxyethylene)polyetherpolyol having 51–98% by weight of ethylene oxide component and (b) poly(oxypropylene-oxyethylene)polyetherpolyol having not less than 51% by weight of propylene oxide component; an organic polyisocyanate; a catalyst; a foaming agent; a surfactant and an additive is fed into a fuel tank and foamed to fill the whole space in the tank with substantially skeletal reticulated flexible polyurethane foam.

The polyetherpolyol (a) to be used in the present invention is obtained by adding to a compound containing two or more functional groups of active hydrogen, ethylene oxide and propylene oxide so that the ethylene oxide component becomes 51–98% by weight and there is no specific limitation concerning the position of ethylene oxide in the chemical structure and ethylene oxide and propylene oxide may be bonded in random or block structure. Furthermore, ethylene oxide may be not always bonded at the terminal of the polyol.

The polyetherpolyol (b) is obtained by adding to a compound containing two or more functional groups of active hydrogen, ethylene oxide and propylene oxide, so that the propylene oxide component becomes not less than 51% by weight and there is no limitation concerning the position of propylene oxide in the chemical structure as in the polyether polyol(a).

In the present invention, a mixture of the polyetherpolyols (a) and (b) is used as a polyhydroxyl compound to be reacted with an organic polyisocyanate. In this case, the mixture ratio of the polyetherpolyol (a) to the polyetherpolyol (b) is 1:9–9:1 by weight. There is no particular limitation concerning each hydroxyl value of the polyetherpolyols (a) and (b) but a mixture of the polyetherpolyols (a) and (b) may be 30–70, preferably 40–60 in an average hydroxyl number.

Compounds having active hydrogen to be used in the production of the polyetherpolyols (a) and (b) as a starting material include, for example, polyalcohols, polyamines and the like, such as ethylene glycol, propylene glycol, glycerine, trimethylol propane, 1,2,6-hexanetriol, pentaerythritol, sorbitol, sucrose, ethanolamine, toluene diamine, triethanolamine, ethylenediamine and the like.

The polyetherpolyols (a) and (b) may be difficultly soluble with each other but in this case, the object of the present invention can be attained by thoroughly mixing just before foaming. Furthermore, in order to produce reticulated flexible polyetherpolyurethane foams, it is preferable that a viscosity of the mixture of the polyetherpolyols (a) and (b) is higher. Accordingly, in order to increase the viscosity of the mixture, it is possible as one embodiment to lower the temperature of the mixture just before foaming.

Organic polyisocyanates to be used for reaction with the polyhydroxyl compounds in the present invention are not particularly limited and are, for example, toluene diisocyanate, phenylene diisocyanate, diphenylmethane diisocyanate, 4,4'-diphenyl diisocyanate, cyclohexane diisocyanate, 1,6-hexamethylene diisocyanate, isophorone diisocyanate, polyphenylpolymethylene polyisocyanate obtained by phosgenating anilineformaldehyde condensate and the like. These compounds are used alone or in admixture of two or more compounds.

Catalysts to be used in the present invention may be ones usually used in the producton of polyurethane foams and are, for example, organic tin compounds, amine compounds and the like. As organic tin compounds, mention may be made of stannous octoate, stannous oleate, dibutyltin dilaurate, dibutyltin di-2-ethylhexanoate, dibutyltin diacetate and the like.

The organic tin compounds are not particularly limited but in order to more favorably accomplish the object of the present invention, tetravalent tin compounds, such as dibutyltin dilaurate is more preferable than divalent tin compounds, such as stannous octoate in view of the foaming stability.

When the organic tin compounds are used, the addition amount must be not more than 0.1 part by weight per 100 parts by weight of the polyhydroxyl compounds when said amount exceeds 0.1 part by weight, cell walls remain in the formed foam and the object of the present invention cannot be attained. When the addition amount is considerably reduced, the foaming stability of the foam becomes poor and cracks are apt to be formed. However, in this case it has been found that the above described drawback is solved by adding urea. That is, when the amount of the organic tin compound added is very small, if urea is added in a range of 0.05–5 parts by weight per 100 parts by weight of the polyhydroxyl compounds, reticulated foams can be stably produced.

As the amine catalyst, there is no particular limitation and the amine catalyst generally used, such as triethylamine, triethylenediamine, N-ethylmorphorine, dimethylethanolamine, dimethylbenzylamine, 1,8-diazabicyclo(5.4.0.)-undethene-7 and phenol salts thereof, formic acid salts of triethylenediamine and the like may be used.

Surfactants to be used in the present invention may be silicone surfactants for producing general polyurethane foams. The cell size of reticulated foams in the present invention can be adjusted by properly selecting the silicone surfactant. Namely, when silicone surfactants having a low surface activity, for example, silicone surfactants for semi-rigid polyurethane foams or cold curing, are used, coarse reticulated foams are obtained, while when silicone surfactants having a high surface activity, for example, silicone surfactants for hot curing are used, fine reticulated foams can be obtained.

In the present invention, water (produce carbon monoxide in the reaction with an organic isocyanate) is mainly used as a foaming agent but, if necessary, organic compounds having a low boiling point, such as monofluorotrichloromethane or methylene chloride, and air may be used. An amount of water compounded may be freely selected depending upon the density of the reticulated foams.

Organic acids or acid anhydrides thereof to be used in the present invention may be ones which contribute to improve the foaming stability and the air permeability when reticulated foams, particularly reticulated foams having coarse cells (less than 10 cells/25 mm) are produced, and are not particularly limited and are, for example, acetic acid, propionic acid, butyric acid, caprylic acid, oxalic acid, malonic acid, succinic acid, glutaric acid, maleic acid, benzoic acid, phthalic acid and acid anhydrides of these organic carboxylic acids and the like. Among these organic carboxylic acids or the acid anhydrides thereof, acetic acid, acetic anhydride, maleic acid and succinic anhydride are preferable in view of use easiness, cost and foaming stability and succinic anhydride is particularly preferable.

An amount of these organic carboxylic acids or the acid anhydrides thereof used is 0.1–10 parts by weight, preferably 1–5 parts by weight per 100 parts by weight of the above described polyhydroxyl compounds. When the use amount is less than 0.1 part by weight, the addition has no effect for improvement of the foaming stability and the air permeability when producing the foams. When the use amount exceeds 10 parts by weight, the acidity of the composition increases and it is impossible to produce the foams stably.

In the present invention, if at least one of the organic carboxylic acids or acid anhydrides thereof is compounded, the desired effect can be obtained but a mixture of two or more compounds may be used. Furthermore, it is preferable that these organic carboxylic acids or the acid anhydrides thereof are previously dissolved in the above mentioned polyetherpolyol (a) and then used, but it is permissible to use these compounds in mixture with the other starting materials.

In the present invention, it has been found that if urea is additionally added to the raw liquid for the foam consisting of the above described compounding components, the reaction rate, the uniformity of the foam cell and the effect for removing the cell wall when foaming are more improved and good reticulated foams can be produced. Namely, when 0.05–5 parts by weight of urea is added based on 100 parts by weight of the polyhydroxyl compounds, reticulated foams having uniform foam cells can be stably produced.

In this case, it is preferably that urea is previously dissolved in water and then used and it is possible to use urea in mixture with the other starting components.

Other than the above described compounding components, fillers, antistatic agents, coloring agents and flame retardants may be added depending upon the performance required for the foam unless the object of the present invention is deviated.

In the present invention, for example, a fuel tank is filled with substantially skeletal reticulated flexible polyetherpolyurethane foam by so-called "one-shot process" wherein the above described starting materials are mixed at a mixing head of a foaming machine and then a given amount of these starting materials is supplied into a fuel tank and foamed. The above described given amount is influenced by the kind of the starting materials and the size of the fuel tank and is the amount of the compounding starting materials necessary for filling the fuel tank with the foam and is easily determined by those skilled in the art.

For better understanding of the invention, reference is taken to the accompanying drawings, wherein.

An embodiment of the safety fuel tank and the method for producing said tank according to the present invention will be explained with reference to the drawings.

Figure 1:
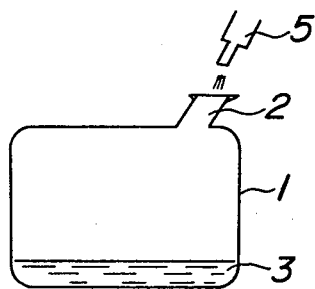
FIG. 1 is a cross-sectional view of a fuel tank showing the state where a raw liquid for foam is charged into an empty fuel tank.

To an empty fuel tank 1 as shown in FIG. 1 is firstly fed an enough amount of compounding starting materials to fill the entire space in the fuel tank upon foaming through an inlet 2 for fuel from an outlet 5 for the starting materials.

This fuel tank requires to make the weight of a vehicle light for saving energy and therefore it is desired to make the tank of a plastic.

Figure 2:
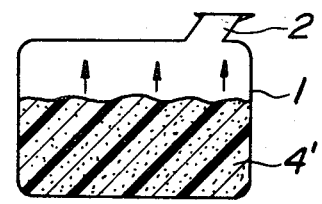
FIG. 2 is a cross-sectional view of the fuel tank where a reaction of the raw liquid shown in FIG. 1 proceeds and the foaming has occurred.
Figure 3:
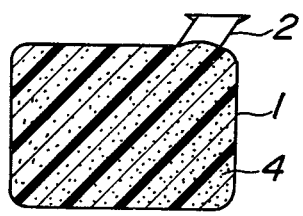
FIG. 3 is a cross-sectional view of the fuel tank filled with substantially skeletal reticulated flexible polyurethane foam.

The above described raw liquid for foam fed in the fuel tank 1 elevates while foaming as the reaction proceeds as shown by 4' in FIG. 2 and finally the entire space in the fuel tank is filled with substantially skeletal reticulated polyetherpolyurethane foam 4 as shown in FIG. 3. In order to promote the foaming stability and the curing of the above described foam, it is preferable to moderately heating the tank.

Figure 4:
FIG. 4 is an enlarged partial cross-sectional view of the vicinity of an inlet for fuel in the fuel tank in FIG. 3.

At an inlet 2 for fuel, a foam skin film is formed and is poor in the air permeability and prevent the supply of the fuel, so that this film must be removed after completing the foaming. FIG. 4 is an enlarged view of the vicinity of the inlet 2 for fuel of the fuel tank 1 in FIG. 3 and shows the state where the skin film is cut off.

Substantially skeletal reticulated flexible polyurethane foam having desired size, cell size, air permeability and other properties can be obtained according to the inventions disclosed in U.S. Patent Application No. 39,414 and Japanese Patent Application and No. 54,151/79, so that when these inventions are used for the fuel tank of the present invention, the starting materials are used depending upon the performance demanded for the fuel tank. For example, when the rate for flowing out a fuel is very slow, a foaming raw liquid for forming a small cell size is used, while when a fast flowing rate is demanded, a foaming raw liquid for forming a large cell size is used.

Since the substantially skeletal reticulated flexible polyetherpolyurethane foams according to the present invention have ether bonds, these foams are not hydrolyzed as in the flexible polyesterpolyurethane foams having ester bonds and a mixture of the specific poly(oxyethylene-oxypropylene) polyetherpolyols having hydrophilic property is used as the polyhydroxyl compounds, so that the formed foams have higher hydrophilic property than the general foams composed of polyoxypropylenepolyol.

Accordingly, in the fuel tanks of automobiles wherein water is apt to stay due to various reasons, it is desirable to use the fuel tanks of the present invention. Namely, in the fuel tanks of the present invention, even if water penetrates into the tank, the foam is hydrophilic, so that water is adsorbed by the foam and it is prevented that water enters the engine from the tank and causes trouble, such as incomplete combustion and further the foam is hardly hyrolyzed, so that the tank can be used for a long period of time.

The present invention will be explained with reference to Example, Reference Examples and Comparative Example.

REFERENCE EXAMPLES 1-3

The starting materials having the compositions as shown in Table 1 were foamed by means of a foaming machine to obtain substantially skeletal reticulated flexible polyetherpolyurethane foams and the physical properties thereof were determined and the obtained results are shown in Table 1.

The hydroxyl group value of a mixture of polyetherpolyols (a) and (b) was 52 and the liquid temperature of each component just before foaming was 20° C.

TABLE 1

| | Reference Example | | |
|---|---|---|---|
| | 1 | 2 | 3 |
| Composition (part by weight) | | | |
| Polyetherpolyol (a) (1) | 70 | 70 | 70 |
| Polyetherpolyol (b) (2) | 30 | 30 | 30 |
| Water | 5.2 | 4.0 | 4.0 |
| Triethylenediamine | 0.05 | 0.05 | 0.05 |
| Dibutyltin dilaurate (3) | 0.01 | 0.03 | 0.03 |
| Urea | 1.0 | — | 0.5 |
| Succinic anhydride | — | 1.0 | 1.0 |

TABLE 1-continued

| | Reference Example | | |
|---|---|---|---|
| | 1 | 2 | 3 |
| Tricresyl phosphate | 1.24 | 3.72 | 3.72 |
| L-544 (4) | 0.5 | — | — |
| L-5302 (5) | — | 0.5 | 0.5 |
| TDI-80 (6) | 64 | 51.3 | 51.3 |
| Isocyanate index (7) | 110 | 110 | 110 |
| Foaming process | Mechanical foaming by means of UBT-65 made by Hennecke Co. | Hand mixing | |
| Physical properties | | | |
| Foam density (g/cm$^3$) | 0.0184 | 0.0290 | 0.0260 |
| Foam hardness | | | |
| 25% ILD (kg/200 mmφ) (8) | 6.0 | — | — |
| 65% ILD (kg/200 mmφ) | 12.0 | — | — |
| 25% CLD hardness (9) (kg/g × 8 cm$^2$) | — | 1.5 | 1.3 |
| Tensile strength (kg/cm$^2$) | 1.83 | 0.84 | 1.1 |
| Elongation (%) | 352 | 182 | 267 |
| Tear strength (kg/cm) | 1.33 | — | — |
| Compression permanent strain (%) (50% compression 70° C. × 22 hr) | 9 | 3.2 | 3.3 |
| Cell number (cell/25 mm) | 18–22 | 11–14 | 10–13 |
| Air permeability (10) (cc/cm$^2$/sec) | >380 | 227 | 252 |

Note:
(1) Polyetherpolyol (a): FA-103 (Trademark), made by Sanyo Kasei Co., poly(oxyethylene-oxypropylene)triol wherein about 70% by weight of ethylene oxide component is randomly bonded, OH number: 50.
(2) Polyetherpolyol (b): MN-3050 (Trademark), made by Mitsui Nisso Urethane Co., poly(oxyethylene-oxypropylene)triol wherein about 98% by weight of propylene oxide component is randomly bonded, OH value: 56,
(3) Tricresyl phosphate: This is used as a diluent for dibutyltin dilaurate and does not influence upon production of foam.
(4) L-544: Made by Japan Unica Co., silicone surfactant having a high surface activity and used for hot curing.
(5) L-5302: Made by Japan Unica Co., silicone surfactant having a low surface activity and used for cold curing.
(6) TDI-80: Made by Japan Polyurethane Co., a mixture of 80% by weight of 2,4-toluene diisocyanate and 20% by weight of 2,6-toluene diisocyanate.
(7) Isocyanate index:
$$\frac{\text{isocyanate group equivalent of isocyanate compound}}{\text{hydroxyl group equivalent of active hydrogen compound}} \times 100.$$
(8) Foam hardness: Measured by JIS K6401.
(9) 25% CLD hardness (kg/8 × 8 cm$^2$): Negative load when a cubical foam having a side of 8 cm is compressed to 25%.
(10) Air permeability: Measured by ASTM D-737-46 (Fragile type air permeability meter of fabric).

Presence or absence of the cell wall in the urethane foam influences upon the air permeability. For example, the air permeability of general flexible urethane foams is 3–6 ft$^3$/min according to ASTM D-1564 Dow air flow meter. However, the reticulated foams according to the present invention exceed the measurement limit (10 ft$^3$/min) of said test process and cannot be measured. Thus, the foams were measured by ASTM D-737-46 Fragile type air permeability meter of fabrics, which is used for test of the materials having high air permeability as shown in Table 1 and all the values are more than 200 cc/cm$^2$/sec and it has been confirmed that the air permeability is very high.

EXAMPLE

The raw liquid in Reference Example 1 was poured into 1 l of vessel made of FRP and integrally foamed therein to produce a safety fuel tank. To this tank was charged a mixture of gasoline and water in a mixture ratio by weight of 10:0.5 and the tank was allowed to stand for 3 months and the mixture was discharged. As the result, the foam integrally formed in the tank adsorbed water and was swelled but the foam was not at all damaged by hydrolysis. The discharged gasoline did not substantially contain water.

The foam had a density of 0.0184 g/cm$^3$ and an air permeability of more than 380 cc/cm$^3$/sec and was lower in the fuel flow resistance than a usual flexible polyurethane foam having cell films and the charging and discharging of a fuel were very easy and the porosity was about 98% and the foam occupied a slight volume in the tank, so that the buffering functional effect of the liquid fuel was obtained without substantially reducing an amount of the fuel stored.

COMPARATIVE EXAMPLE

Reticulated flexible polyesterpolyurethane foam produced by heat treatment process (Japanese Patent No. 477,027) was cut into a form of 1 l of FRP vessel and said cut foam was adhered to said vessel with an adhesive to form a fuel tank. Into this tank was charged the mixture of gasoline and water as described in the above described Example and the tank was left to stand for 3 months and then the mixture was discharged. As the result, the foam was damaged with hydrolysis at the portion (lower portion of the tank) where the foam contacts with water and thereafter when gasoline was charged therein, the foam moved together with gasoline and the cushioning function was very poor.

A raw liquid (Japanese Patent No. 565,771) for forming reticulated foam which uses polyoxypropylenepolyol as a polyhydroxyl compound was poured into the vessel as described in the above described Example and integrally foamed to produce a fuel tank and the same test as in Example was conducted. As the result, the integrally formed foam was not damaged by hydrolysis but water was taken out without being adsorbed.

In the safety fuel tank of the present invention formed as mentioned above, the formed foam was strongly adhered to the tank wall surface by the self adhesion of the foam without using an adhesive, so that the labor for cutting the foam into the tank shape and adhering said foam to the tank with an adhesive as in the conventional manner was not needed and the production was simplified. In the prior production process wherein the foam is cut, when a tank having a complicated shape is produced, spaces, not filled with foam were formed and the buffering function lowered and it was difficult to adhere the foam over the tank wall surface and therefore the adhesive strength was low as the whole. However, according to the present invention, the tank was filled with the foam to corners of a complicated shaped tank only by pouring the above described raw liquid for foam into the tank and was tightly adhered to the foam by the self adhesion of the above described foam.

The reticulated foam integrally formed in the tank has hydrophilic property and has a high resistance against the hydrolysis, so that the present invention can be preferably used for the fuel tanks of automobiles in which the water penetration is liable to occur.

Thus, in the present invention, the reticulated flexible polyurethane foam filled in the fuel tank acts as a buffering material and the waving of a liquid fuel and the transfer of the center of gravity owing to inclination upon driving of vehicles can be prevented and the safety during driving can be maintained. Upon concerning of vehicles, when an amount of the liquid fuel is small, the liquid fuel accumulates at a portion of the tank and therefore the fuel is not sucked nor supplied to the engine but according to the present invention, the accumulation of the fuel in corner of the tank is prevented by the above described foam and the fuel is supplied to the engine from the tank.

In addition, even if a breakage of the tank occurs owing to collision of a vehicle or the other outer force, since the above described foam has been integrally foamed, the instantaneous scattering of the fuel is prevented and the explosive fire is not caused.

As mentioned above, the fuel tanks according to the present invention can be used not only for safety fuel tanks for vehicles, such as automobiles but also for general fuel tanks and for airplanes, ships and the like, so that the fuel tanks are very high in the commercial utility.

What is claimed is:

1. A safety fuel tank wherein substantially skeletal reticulated flexible polyurethane foam is integrally foamed, which is obtained by reacting a mixture of (a) poly(oxypropylene-oxyethylene)polyetherpolyol having 51-98% by weight of ethylene oxide component and (b) poly(oxypropylene-oxyethylene)polyetherpolyol having not less than 51% by weight of propylene oxide component as the polyhydroxyl compound with an organic polyisocyanate in the presence of a catalyst, a foaming agent, a surfactant and an additive in a fuel tank.

2. A method for producing a safety fuel tank, the entire space of which is filled with substantially skeletal reticulated flexible polyurethane foam, which comprises feeding a given amount of a compounding liquid for a flexible polyurethane foam consisting of polyhydroxyl compounds consisting of a mixture of (a) poly-(oxypropylene-oxyethylene)polyetherpolyol having 51-98% by weight of ethylene oxide component and (b) poly(oxypropylene-oxyethylene)polyetherpolyol having not less than 51% by weight of propylene oxide component; an organic polyisocyanate; a catalyst; a foaming agent; a surfactant and an additive into a fuel tank, and foaming said compounding liquid.

3. A safety fuel tank as claimed in claim 1, wherein the mixture ratio by weight of said poly(oxypropylene-oxyethylene)polyetherpolyol (a) to said poly(oxypropylene-oxyethylene)polyether polyol (b) is 1:9-9:1.

4. A safety fuel tank as claimed in claim 1, wherein an average hydroxyl number of the mixture of the poly(oxypropylene-oxyethylene)polyetherpolyol (a) and the poly(oxypropylene-oxyethylene)polyetherpolyol (b) is 30-70.

5. A safety fuel tank as claimed in claim 1, wherein as the additive, at least one of organic carboxylic acids or the acid anhydrides thereof is used in a rate of 0.1-10 parts by weight per 100 parts by weight of the polyhydroxyl compound.

6. A safety fuel tank as claimed in claim 1, wherein as the additive, urea is used in a rate of 0.05-5 parts by weight per 100 parts by weight of the polyhydroxyl compound.

7. A safety fuel tank as claimed in claim 5, wherein said organic carboxylic acids or the acid anhydrides thereof are selected from the group consisting of acetic acid, propionic acid, butyric acid, caprylic acid, oxalic acid, malonic acid, succinic acid, glutaric acid, maleic acid, benzoic acid, phthalic acid and the acid anhydrides thereof.

8. A safety fuel tank as claimed in claim 1, wherein the catalyst is selected from the group consisting of organic tin compounds and amine compounds.

9. A safety fuel tank as claimed in claim 8, wherein the organic tin compounds are stannous octoate, stannous oleate, dibutyltin dilaurate, dibutyltin di-2-ethylhexanoate or dibutyltin diacetate.

10. A safety fuel tank as claimed in claim 9, wherein dibutyltin dilaurate is used in an amount of not more than 0.1 part by weight per 100 parts by weight of the polyhydroxyl compound.

* * * * *